United States Patent
Jiang et al.

(10) Patent No.: US 9,307,425 B2
(45) Date of Patent: Apr. 5, 2016

(54) METHOD AND DEVICE FOR TRANSFERRING DATA

(71) Applicant: Huawei Technologies Co., Ltd., Shenzhen, Guangdong (CN)

(72) Inventors: Yi Jiang, Shenzhen (CN); Wei Quan, Shenzhen (CN); Jian Zhang, Shenzhen (CN); Peng Zhang, Shenzhen (CN); Guanglin Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/324,865

(22) Filed: Jul. 7, 2014

(65) Prior Publication Data

US 2014/0321267 A1 Oct. 30, 2014

Related U.S. Application Data

(63) Continuation of application No. PCT/CN2013/070115, filed on Jan. 6, 2013.

(30) Foreign Application Priority Data

Jan. 6, 2012 (CN) .......................... 2012 1 0002978

(51) Int. Cl.
*H04L 12/26* (2006.01)
*H04W 24/04* (2009.01)
(Continued)

(52) U.S. Cl.
CPC ............. *H04W 24/04* (2013.01); *H04L 45/28* (2013.01); *H04W 28/08* (2013.01); *H04W 76/025* (2013.01)

(58) Field of Classification Search
CPC ..... H04W 24/00; H04W 24/02; H04W 24/04; H04W 28/08; H04W 28/02; H04W 28/0268; H04W 28/0252; H04W 28/085; H04W 28/0205–28/0294; H04W 76/025; H04W 76/027; H04W 76/028; H04L 45/28; H04L 45/245; H04L 41/0672
USPC ......................................................... 370/225
See application file for complete search history.

(56) References Cited

U.S. PATENT DOCUMENTS 5,142,531 A * 8/1992 Kirby ...................... H04L 45/00
370/254
2005/0251595 A1* 11/2005 Lesartre ................ H04L 1/0045
710/71
(Continued)

FOREIGN PATENT DOCUMENTS

| CN | 1893338 A | 1/2007 |
| CN | 1964249 A | 5/2007 |

(Continued)

*Primary Examiner* — Afsar M Qureshi
(74) *Attorney, Agent, or Firm* — Leydig, Voit & Mayer, Ltd.

(57) ABSTRACT

Provided in embodiments of the present invention are a method and a device for transferring data. The method includes: transferring data to a base station via a first link, a second link offloading for the first link; if a radio link failure (RLF) occurs on the first link, transmitting an RLF indication message to the base station, where the RLF indication message is used to notify the base station that the RLF occurs on the first link; and transferring, over the second link, at least a portion of the data on the first link. According to embodiments of the present invention, when a link failure occurs between a user equipment and the base station during a mobile data offloading process, data transfer is performed via the offloading link, a time delay can be reduced and the data transfer efficiency is improved.

20 Claims, 6 Drawing Sheets

(51) Int. Cl.
*H04L 12/703* (2013.01)
*H04W 28/08* (2009.01)
*H04W 76/02* (2009.01)

(56) References Cited

U.S. PATENT DOCUMENTS

2006/0291378 A1    12/2006    Brotherston et al.
2009/0199040 A1*   8/2009    Liu .................... H04L 45/00
                                                              714/4.1
2011/0286327 A1*   11/2011   Chen ................... H04W 76/028
                                                              370/225
2014/0079007 A1*   3/2014    Li ........................ H04W 28/10
                                                              370/329

FOREIGN PATENT DOCUMENTS

| CN | 101132611 A | 2/2008 |
| CN | 101729292 A | 6/2010 |
| CN | 102215530 A | 10/2011 |
| EP | 2273843 A1 | 1/2011 |
| WO | WO 2010088329 A1 | 8/2010 |

* cited by examiner

METHOD AND DEVICE FOR TRANSFERRING DATA

CROSS-REFERENCE TO RELATED APPLICATIONS

This application is a continuation of International Patent Application No. PCT/CN2013/070115, filed Jan. 6, 2013, which claims priority to Chinese Patent Application No. 201210002978.2, filed Jan. 6, 2012, both of which are hereby incorporated by reference in their entireties.

TECHNICAL FIELD

Embodiments of the present invention relate to the field of wireless communication and, in particular, to a method and a device for transferring data.

BACKGROUND

With a growth of mobile internet services, data amount in a wireless communication network surges sharply, accelerating a demand for the bandwidth. In order to alleviate the congestion of a mobile cellular network, network operators need to deploy more base stations to improve the network capacity, but this will certainly increase the investment cost and maintenance cost. To solve such contradiction, more and more network operators have chosen a mobile data offloading method for offloading a portion of data in a mobile network to other available access techniques, as a supplementary to the mobile network. Currently, the main supplementary network technologies used for the mobile data offloading include WiFi (Wireless Fidelity, wireless fidelity), a home base station, and an IMB (Integrated Mobile Broadcast, integrated mobile broadcast), etc.

WiFi is a standard of WLAN (Wireless Local Access Network, wireless local access network), and is a communication network consisting of a wireless network card and an AP (Access Point, access point). The AP is referred to as a network bridge or an access point generally, which is a bride between a traditional wired local access network and a wireless local access network. Therefore, a UE (User Equipment, user equipment) with the wireless network card mounted may share resources of the wired local access network and even of a wide area network via the AP; the working principle thereof is equivalent to a HUB or a router with a built-in wireless transmitter. The wireless network card is a client device responsible for receiving signals transmitted by the AP.

The LTE (Long Term Evolved, long term evolved) is a kind of mobile communication network which is studied by manufacturers in the current 3GPP ($3^{rd}$ Generation Partnership Program, $3^{rd}$ generation partnership program) organization actively, and is an evolved network of a UMTS (Universal Mobile Telecommunication System, universal mobile telecommunication system). The LTE aims to provide a low-cost network which can reduce the time delay, improve the user data rate, and enhance the system capacity and coverage. An air-interface of the LTE network is achieved by deploying an eNB (evolved Node B), and the air-interface transmission for a mobile service is achieved by a communication between the UE and the eNB.

In the existing LTE technique, data transmitted on the air-interface is carried on different RBs (Radio Bearer, radio bearer) according to information such as QoS (Quality of Service, quality of service) and the like, where a SRB (Signaling Radio Bearer, signaling radio bearer) is used for carrying an RRC (Radio Resource Control, radio resource control) message (i.e. an RRC signaling), and a DRB (Data Radio Bearer, data radio bearer) is used for carrying data. During the process and/or after the process when the RRC is established between the eNB and the UE, the eNB may configure one or more RBs for the UE for carrying different types of data.

When detecting an RLF (Radio Link Failure, radio link failure), the UE initiates an RRC connection reestablishment procedure, resulting in a time delay for data transfer.

SUMMARY

Embodiments of the present invention provide a method and a device for transferring data, which can reduce a time delay during a mobile data offloading process and improve data transfer efficiency.

In one aspect, a method for transferring data is provided, including: transferring the data with a base station via a first link, a second link offloading for the first link; if a radio link failure (RLF) occurs on the first link, transmitting an RLF indication message to the base station, wherein the RLF indication message is used to notify the base station that the RLF occurs on the first link; transferring, over the second link, at least a portion of the data on the first link.

In another aspect, a method for transferring data is provided, including: transferring the data with a user equipment (UE) via a first link, a second link offloading for the first link; if a radio link failure (RLF) occurs on the first link, receiving a RLF indication message from the UE, wherein the RLF indication message is used to notify that the RLF occurs on the first link; according to the RLF indication message, transferring, over the second link, at least a portion of the data on the first link.

In another aspect, a device for transferring data is provided, including: a first transfer unit, configured to transfer data with a base station via a first link, a second link offloading for the first link; a message transmission unit, configured to, transmit, if a radio link failure (RLF) occurs on the first link, an RLF indication message to the base station, wherein the RLF indication message is used to notify the base station that the RLF occurs on the first link; a second transfer unit, configured to transfer, over the second link, at least a portion of the data on the first link.

In another aspect, a device for transferring data is provided, including: a first transfer unit, configured to transfer data with a user equipment (UE) via a first link, a second link offloading for the first link; a message receiving unit, configured to, receive, if a radio link failure (RLF) occurs on the first link, an RLF indication message from the UE, wherein the RLF indication message is used to notify that the RLF occurs on the first link; a second transfer unit, configured to transfer, over the second link, at least a portion of the data on the first link according to the RLF indication message.

According to embodiments of the present invention, when a radio link failure occurs between the user equipment and the base station during a mobile data offloading process, data transfer is performed via the offloading link, thus a time delay can be reduced and the data transfer efficiency is improved.

BRIEF DESCRIPTION OF DRAWINGS

In order to make technical solutions of embodiments of the present invention more clear, accompanying drawings used in description of the embodiments or the prior art are briefly described hereunder. Obviously, the described drawings are merely some embodiments of present invention. For persons skilled in the art, other drawings may be obtained based on these drawings without any creative work.

DESCRIPTION OF EMBODIMENTS

The technical solutions in embodiments of the present invention are hereinafter described clearly and completely with reference to the accompanying drawings in embodiments of the present invention. Obviously, the described embodiments are a part of embodiments of the present invention, rather than all embodiments of the present invention. All the other embodiments obtained by persons of ordinary skill in the art based on embodiments of the present invention without any creative efforts shall fall within the protection scope of the present invention.

The technical solutions of the present invention may be applied in various communication systems, e.g., a GSM, a code division multiple access (CDMA, Code Division Multiple Access) system, wideband code division multiple access (WCDMA, Wideband Code Division Multiple Access), a general packet radio service (GPRS, General Packet Radio Service), long term evolution (LTE, Long Term Evolution), etc.

The user equipment (UE, User Equipment) may also be referred to as a mobile terminal (Mobile Terminal), a mobile user equipment, etc., and may communicate with one or more core networks via a radio access network (e.g., RAN, Radio Access Network). The user equipment may be a mobile terminal such as a mobile phone (or referred to as a "cellular" phone) and a computer with a mobile terminal, e.g., may be a portable mobile device, a mini mobile device, a hand-held mobile device, a built-in mobile device of a computer or a vehicle-mounted mobile device, and they exchange voice and/or data with the radio access network.

The base station may be a base transceiver station (BTS, Base Transceiver Station) in the GSM or CDMA, may also be a NodeB (NodeB) in the WCDMA, may also be an evolved NodeB (eNB or e-NodeB, evolved NodeB) in the LTE, and is not limited thereto in the present invention.

The base station may directly establish a link with the UE for data transfer, and may also offload a portion of data in a mobile network to an access technology for data transfer with the UE through mobile data offloading access techniques such as WiFi (Wireless Fidelity, wireless fidelity), a home base station, and an IMB (Integrated Mobile Broadcast, integrated mobile broadcast), etc.

Figure 1:
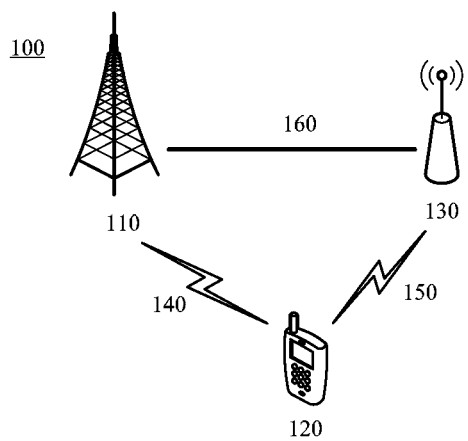
FIG. 1 is a schematic diagram of a communication system 100 in which embodiments of the present invention can be applied.

FIG. 1 is a schematic diagram of a communication system 100 in which embodiments of the present invention can be applied.

As shown in FIG. 1, the communication system 100 includes a base station 110, a UE 120, and an access point 130.

The base station 110 may be but is not limited to an eNB of the LTE network, the UE 120 may be but is not limited to a mobile telephone, a portable computer, etc., and the access point 130 may be but is not limited to an AP (Access Point, access point) in WiFi technology, an access point of a home base station, an access point of IMB, etc. The UE 120 establishes a first link 140 with the base station 110. The UE 120 may also establish a second link with the base station 110 via the access point 130 to offload for the first link 140. The second link may include a third link 150 from the UE to the access point 130 and a fourth link 160 from the access point 130 to the base station 110. In embodiments of the present invention, the first link 140 and the third link 150 may be wireless links. The fourth link 160 may be a wireless link, and may also be a wired link based on a wired network. Therefore, the UE 120 may perform data transfer with the base station via the first link 140 and the offloading second link.

Figure 2:
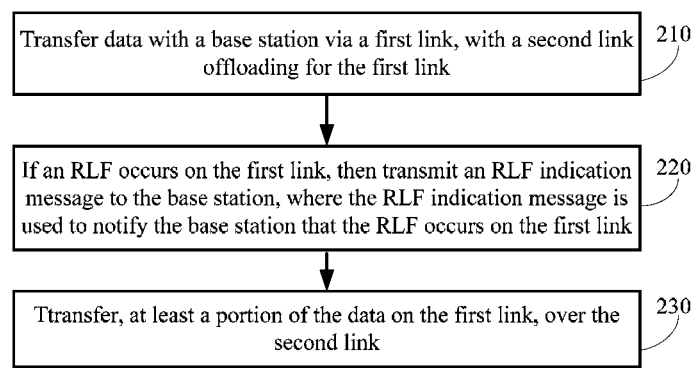
FIG. 2 is a schematic flowchart of a method for transferring data according to an embodiment of the present invention.

FIG. 2 is a schematic flowchart of a method for transferring data according to an embodiment of the present invention. The method of FIG. 2 is performed by a UE. The method of FIG. 2 is described hereunder with reference to the communication system 100 as shown in FIG. 1.

210, transfer data with a base station via a first link, with a second link offloading for the first link.

For example, in the communication system 100 as shown in FIG. 1, the UE 120 and the base station 110 transfer data via the first link 140, and the second link (including the third link 150 and the fourth link 160) offloads for the first link 140.

220, if an RLF occurs on the first link, then transmit an RLF indication message to the base station, where the RLF indication message is used to notify the base station that the RLF occurs on the first link.

The UE detects an RLF occurring on the first link between the UE and the base station mainly for the following reasons:

Physical link failure: When an RRC (Radio Resource Control, radio resource control) layer of the UE successively receives N310 "out-of-sync (out-of-synchronization)" indications from a physical layer, a T310 timer is started; when the T310 timer times out, an RLF is considered to occur; or, Random access (Random Access, RA) failure: When an RRC layer of the UE receives an RA problem indication transmitted by an MAC (Media Access Control) layer, an RLF is considered to occur; or, Data transmission failure: When retransmission received by an RRC layer of the UE and transmitted by an RLC (Radio Link Control) layer reaches the maximum time indication, an RLF is considered to occur;

The RLF indication message is used to notify the base station by the UE that an RLF occurs on the first link, and meanwhile the RLF indication message may also include the reasons for the occurrence of the RLF as above.

Alternatively, as another embodiment, the RLF indication message can be a newly-added information element in an RRC message, can also be a newly-added RRC message, and can still be an MAC control element (Control Element, CE).

230, transfer, at least a portion of the data on the first link, over the second link.

Alternatively, as an embodiment, in step 220, in a case where the offloading by the second link for the first link is offloading not based on a radio bearer (Radio Bearer, RB), the RLF indication message can also be used to request the base station to offload onto the second link at least a portion of downlink data scheduled on the first link. In step 230, the UE may schedule at least a portion of uplink data on the first link to offload onto the second link. It should be understood that, the offloading not based on an RB, may refer that: as for any one RB between the UE and the base station, each data packet of the RB may be transferred over the first link and may also be transferred over the second link. Therefore, when the base station instructs the UE to perform an uplink data and/or downlink data offloading, the base station does not need to indicate the UE data of which one or multiple RBs can be offloaded. During an uplink transmission process, the UE may use a service access point to offload data on any RBs according to a scheduling policy.

Alternatively, as another embodiment, in step 220, in a case where the offloading by the second link for the first link is based on an RB and a signaling radio bearer (Signaling Radio Bearer, SRB) is scheduled on the second link for transfer, the RLF indication message may also be used to request the base station to configure at least one RB on the first link, so that the at least one RB is offloaded onto the second link. The UE may also receive, via the SRB, an offloading reconfiguration message transmitted by the base station according to the RLF indication message, where the offloading reconfiguration message is used to indicate information of at least one RB offloaded from the first link onto the second link. In step 230, the UE may transfer, over the second link, the at least one RB on the first link according to the offloading reconfiguration message.

It should be understood that the offloading reconfiguration message may be a newly-added information element in an RRC message, may also be a newly-added RRC message, and may still be an MAC CE. The offloading based on an RB may refer that: as for any one RB between the UE and the base station, all the data packets of the RB can only be transferred over one designated link, i.e., is transferred either over a designated first link, or over a designated second link. Therefore, when the base station instructs the UE to perform an uplink data and/or downlink data offloading, the base station needs to configure data of which one or multiple RBs of the UE can be offloaded. The SRB being scheduled on the second link for transfer may refer that data packets in the SRB can merely be transferred over the second link. Specifically, after receiving the offloading reconfiguration message transmitted by the base station, the UE updates an offloading configuration parameter, and may transmit an offloading reconfiguration complete message to the base station after completing the reconfiguration. The offloading reconfiguration message may include configuration about which one or multiple RBs need to be offloaded onto the second link and is used to offload the data of the RB, which is originally configured on the first link for transfer, onto the second link.

It should be noted that, names for the foregoing messages are names used for the convenience of description merely, and are not intended to limit the scope to which embodiments of the present invention is applicable, i.e., some systems may not have similar names, however, it should not be considered that technical solutions in embodiments of the present invention can not be applicable to these systems.

Alternatively, as another embodiment, when an RLF occurs on the first link, the UE may start a first timer. Within a time length of the first time, the UE may monitor whether the first link is recovered, where the time length is pre-configured by the base station or is a default configuration in a wireless protocol. In a case where the UE detects that the first link is recovered, an RA is initiated so as to transfer data with the base station via the recovered first link.

Alternatively, as another embodiment, the UE may monitor whether N in-sync (in-sync) indications are detected successively, where the N is a natural number and is pre-configured by the base station or is a default configuration in a wireless protocol, so as to judge whether the first link is recovered.

Alternatively, as another embodiment, in a case where the first timer times out and the first link being not recovered is monitored, the UE can initiate an RRC connection reestablishment procedure and suspend all the RBs of the first link and all the RBs of the second link, so as to reestablish the first link.

According to embodiments of the present invention, when a radio link failure occurs between the user equipment and the base station during a mobile data offloading process, data transfer is performed via the offloading link, thus a time delay can be reduced and the data transfer efficiency is improved.

It should be understood that in embodiments of the present invention, the term "and/or" is just an associated relationship for describing related objects which represents that three possible relations may be in existence, e.g., A and/or B may represent three situations: A exists alone, A and B exist at a same time, and B exists alone.

Figure 3:
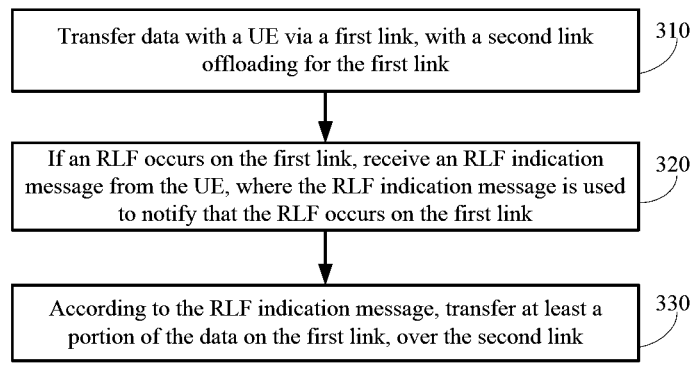
FIG. 3 is a schematic flowchart of a method for transferring data according to another embodiment of the present invention.

FIG. 3 is a schematic flowchart of a method for transferring data according to another embodiment of the present invention. The method of FIG. 3 is performed by a base station.

310, transfer data with a UE via a first link, with a second link offloading for the first link.

For example, in the communication system 100 as shown in FIG. 1, the base station 110 and the UE 120 transfer data via the first link 140, and the second link (including the third link 150 and the fourth link 160) offloads for the first link 140.

320, if an RLF occurs on the first link, receive an RLF indication message from the UE, where the RLF indication message is used to notify that the RLF occurs on the first link.

The UE detects an RLF occurring on the first link between the UE and the base station mainly for the following reasons:

Physical link failure: When an RRC layer of the UE successively receives N310 "out-of-sync" indications from a physical layer, a T310 timer is started; when the T310 timer times out, an RLF is considered to occur; or, RA failure: When the RRC layer of the UE receives an RA problem indication transmitted by an MAC layer, an RLF is considered to occur; or, Data transmission failure: When retransmission received by the RRC layer of the UE and transmitted by an RLC layer reaches the maximum time indication, an RLF is considered to occur.

The RLF indication message is used to notify the base station by the UE that the RLF occurs on the first link, and meanwhile the RLF indication message can also include the reasons for the occurrence of the RLF as above.

Alternatively, as another embodiment, in a case where the offloading by the second link for the first link is offloading not based on an RB, the RLF indication message may also be used to request to offload onto the second link at least a portion of downlink data scheduled on the first link. It should be understood that, the offloading not based on an RB, may refer that: as for any one RB between the UE and the base station, each data packet of the RB may be transferred over the first link and may also be transferred over the second link. Therefore, when the base station instructs the UE to perform an uplink data and/or downlink data offloading, the base station does not need to indicate the UE data of which one or multiple RBs can be offloaded. During a downlink transmission process, the base station may use a service access point of the UE to offload data on any RBs of the UE according to a scheduling policy.

Alternatively, as another embodiment, in a case where the offloading by the second link for the first link is offloading based on an RB and an SRB is scheduled on the second link for transfer, the RLF indication message can also be used to request to configure at least one RB on the first link, so that the at least one RB is offloaded onto the second link. The base station can transmit an offloading reconfiguration message to the UE according to the RLF indication message via the SRB, where the offloading reconfiguration message is used to indicate information of at least one RB offloaded from the first link onto the second link.

It should be understood that the offloading based on an RB, may refer that: as for any one RB between the base station and the UE, all the data packets of the RB can only be transferred over one designated link, i.e., is transferred either over a designated first link, or over a designated second link. Therefore, when the base station instructs the UE to perform an uplink data and/or downlink data offloading, the base station needs to configure data of which one or multiple RBs of the UE can be offloaded. The SRB being scheduled on the second link for transfer may refer that data in the SRB can merely be transferred over the second link. Specifically, after receiving the RLF indication message, the base station can transmit an offloading reconfiguration message to the UE according to a request of the RLF indication message, the offloading reconfiguration message can include configuration about which one or multiple RBs need to be offloaded onto the second link and is used to offload data of the RB, which is originally configured on the first link for transfer, onto the second link.

Alternatively, as an embodiment, the RLF indication message can be a newly-added information element in an RRC message, can also be a newly-added RRC message, and can still be an MAC CE.

330, according to the RLF indication message, transfer at least a portion of the data on the first link, over the second link.

Alternatively, as another embodiment, when an RLF occurs on the first link, the base station can start a second timer. Within a time length of the second timer, the base station can monitor whether the first link is recovered, where the time length is pre-configured by itself. In a case where the first link being recovered is detected, the base station can trigger the UE to initiate an RA, via a physical downlink control channel (Physical Downlink Control Channel, PDCCH) command, so as to transfer data with the UE via the recovered first link.

Alternatively, as another embodiment, the base station may monitor whether N in-sync (in-sync) indications are detected successively, where the N is a positive integer and is pre-configured by itself, so as to judge whether the first link is recovered.

Alternatively, as another embodiment, in a case where the second timer times out and it is monitored that the first link is not recovered, the base station can initiate an RRC connection release procedure so as to release the first link. For example, when detecting that the first link is recovered, the base station, via a PDCCH command, triggers the UE to initiate an RA. If the base station assigns a dedicated Preamble (Preamble) for the UE, the UE uses the dedicated Preamble to initiate the RA procedure; otherwise, the UE randomly selects a Preamble to initiate the RA procedure. Or, when the second timer times out and it is monitored that the first link is not recovered, the base station can initiate the RRC connection release procedure via an RRC connection release message, and can also indicate in the message that the reason for the release is that the first link cannot be recovered.

It should be noted that, names for the foregoing messages are names used for the convenience of description merely, and are not intended to limit the scope to which embodiments of the present invention is applicable, i.e., some systems may not have similar names, however, it should not be considered that technical solutions in embodiments of the present invention cannot be applicable to these systems.

According to embodiments of the present invention, when a radio link failure occurs between the user equipment and the base station during a mobile data offloading process, data transfer is performed via the offloading link, thus a time delay can be reduced and the data transfer efficiency is improved.

In the prior art, after the UE detects that an RLF occurs on a link between the UE and the base station, the base station will continue to transmit the data to the UE, resulting in a waste of transmission resources.

Figure 4:
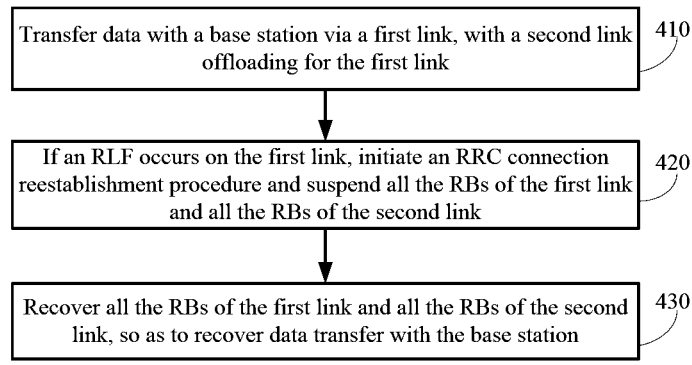
FIG. 4 is a schematic flowchart of a method for transferring data according to another embodiment of the present invention.

FIG. 4 is a schematic flowchart of a method for transferring data according to another embodiment of the present invention. The method of FIG. 4 is performed by a UE.

410, transfer data with a base station via a first link, with a second link offloading for the first link.

For example, in the communication system as shown in FIG. 1, the UE and the base station perform data transfer via the first link 140, and the second link (including the third link 150 and the fourth link 160) offloads for the first link 140.

420, if an RLF occurs on the first link, initiate an RRC connection reestablishment procedure and suspend all the RBs of the first link and all the RBs of the second link.

The UE detects the RLF occurring on the first link between the UE and the base station, mainly for the following reasons:

Physical link failure: When an RRC layer of the UE receives N310 "out-of-sync" indications from a physical layer successively, a T310 timer is started; when the T310 timer times out, an RLF is considered to occur; or, RA failure: When the RRC layer of the UE receives an RA problem indication transmitted by an MAC layer, an RLF is considered to occur; or, Data transmission failure: When retransmission received by the RRC layer of the UE and transmitted by an RLC layer reaches the maximum time indication, an RLF is considered to occur.

In addition, in a case where the offloading by the second link for the first link is offloading based on an RB and a SRB is scheduled on the second link for transfer, or in a case where the offloading by the second link for the first link is offloading based on an RB and a SRB is not scheduled on the second link for transfer, the UE can initiate an RRC connection reestablishment procedure, suspend all the RBs of the first link with the base station and all the RBs of the second link with the access point, and stop the data transfer process. After suspending all the RBs with the second link, if the UE receives downlink data transmitted by the access point, the UE receives the downlink data normally.

430, recover all the RBs of the first link and all the RBs of the second link, so as to recover data transfer with the base station.

According to embodiments of the present invention, when a radio link failure occurs between the user equipment and the base station during a mobile data offloading process, transmission resources can be saved by stopping the data transfer process.

Figure 5:
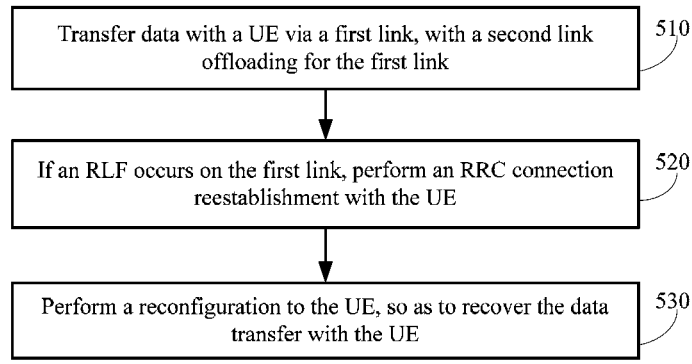
FIG. 5 is a schematic flowchart of a method for transferring data according to another embodiment of the present invention.

FIG. 5 is a schematic flowchart of a method for transferring data according to another embodiment of the present invention. The method of FIG. 5 is performed by a base station.

510, transfer data with a UE via a first link, with a second link offloading for the first link.

For example, in the communication system as shown in FIG. 1, the UE and the base station transfer data via the first link 140, and the second link (including the third link 150 and the fourth link 160) offloads for the first link 140.

520, if an RLF occurs on the first link, perform an RRC connection reestablishment with the UE.

The UE detects an RLF occurring on the first link between the UE and the base station mainly for the following reasons: physical link failure: when an RRC layer of the UE successively receives N310 "out-of-sync" indications from a physical layer, a T310 timer is started, when the T310 timer times out, an RLF is considered to occur; or, RA failure: when the RRC layer of the UE receives an RA problem indication transmitted by an MAC layer, an RLF is considered to occur; or, data transmission failure: when retransmission received by the RRC layer of the UE and transmitted by an RLC layer reaches the maximum time indication, an RLF is considered to occur.

530, perform a reconfiguration to the UE, so as to recover the data transfer with the UE.

Alternatively, as an embodiment, the base station can modify an RB of the second link, and information of the connection to the access point of the second link corresponding to the RB. For example, an RB between the UE and a service access point corresponds to a link between the access point and the base station. During the reconfiguration procedure to the UE, if the base station modifies information of one or more RB offloaded to the service access point of the UE, the base station needs to modify corresponding information of the connection with the access point accordingly.

According to embodiments of the present invention, when a radio link failure occurs between the user equipment and the base station during a mobile data offloading process, transmission resources can be saved by stopping the data transfer process.

Figure 6:
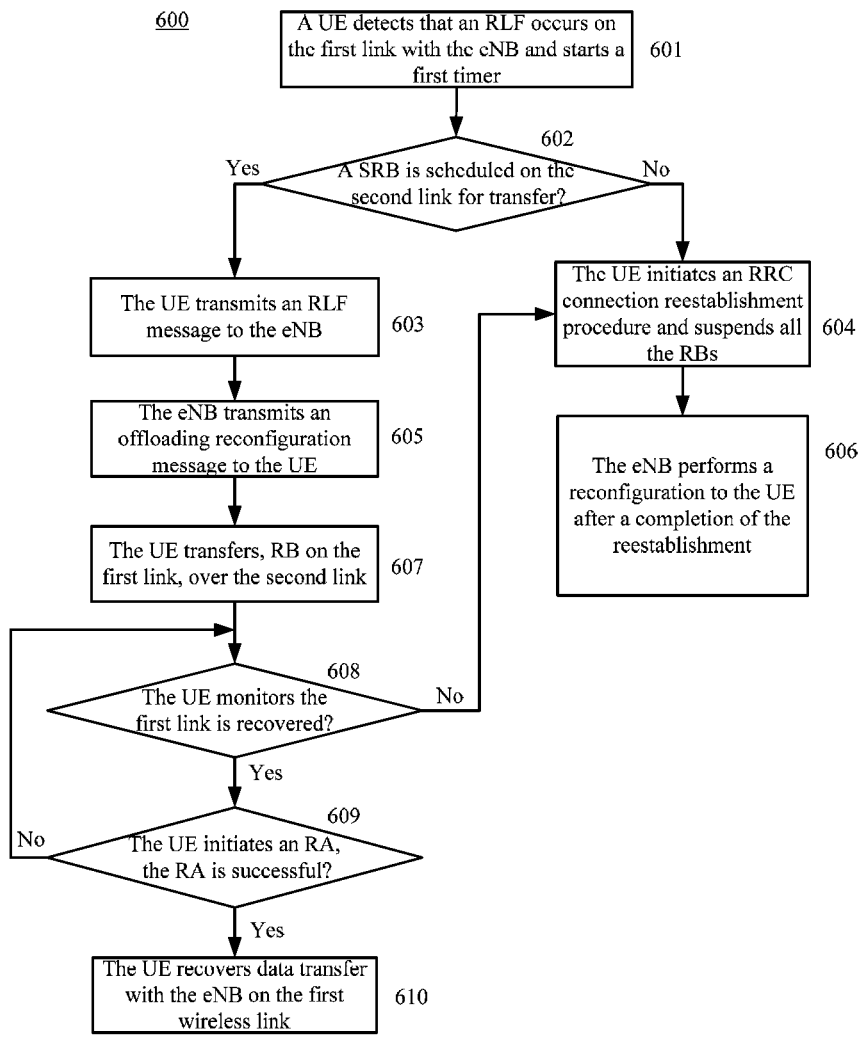
FIG. 6 is a schematic flowchart of a method for transferring data according to another embodiment of the present invention.

Embodiments of the present invention are described hereunder in more details with reference to specific examples. FIG. 6 is a schematic flowchart of a method for transferring data according to another embodiment of the present invention. In FIG. 6, an example is illustrated based on an offloading for the LTE network by WiFi technology. In FIG. 6, a first link (e.g., the first link 140 as shown in FIG. 1) is established between a UE and an eNB, the UE establishes a second link (e.g., including the third link 150 and the fourth link 160 as shown in FIG. 1) with the eNB via a WiFi AP, offloading by the second link for the first link is offloading based on an RB.

601, a UE detects that an RLF occurs on the first link with the eNB and starts a first timer.

602, the UE judges whether a SRB is scheduled on the second link for transfer.

When it is judged in step 602 that the SRB is scheduled on the second link for transfer, then in step 603, the UE transmits an RLF indication message to the eNB, notifies the eNB that the RLF occurs, and requests, via the RLF indication message, the eNB to configure at least one RB on the first link, so that the at least one RB is offloaded onto the second link.

On the other hand, when it is judged in step 602 that the SRB is not scheduled on the second link for transfer, proceed to step 604 from step 602. Step 604 is similar to step 420 as shown in FIG. 4, the UE initiates an RRC connection reestablishment procedure and suspends all the RBs of the first link and all the RBs of the second link.

In step 605, the eNB transmits an offloading reconfiguration message to the UE according to the RLF indication message, where the offloading reconfiguration message indicates information of at least one RB offloaded from the first link onto the second link.

After step 604, step 606 is similar to step 530 as shown in FIG. 5, in step 606, the eNB performs a reconfiguration to the UE, so as to recover the first link.

After step 605, in step 607, the UE, according to the offloading reconfiguration message, transfers at least one RB on the first link over the second link.

In step 608, the UE monitors whether the first link is recovered.

When the UE monitors in step 608 that the first link is recovered, then in step 609, the UE initiates an RA, and judges whether the RA is successful.

In a case where the UE monitors in step 608 that the first link is not recovered and the first timer times out, proceed to step 604, and the UE initiates the RRC connection reestablishment procedure and suspends all the RBs of the first link and all the RBs of the second link.

When the UE judges in step 609 that the RA is successful, then proceed to step 610, the UE recovers data transfer with the eNB.

When the UE judges in step 609 that the RA is not successful, then proceed to step 608, and the UE continues to monitor whether the first link is recovered.

According to embodiments of the present invention, when a radio link failure occurs between the user equipment and the base station during a mobile data offloading process, data transfer is performed via the offloading link, thus a time delay can be reduced and the data transfer efficiency is improved.

Figure 7:
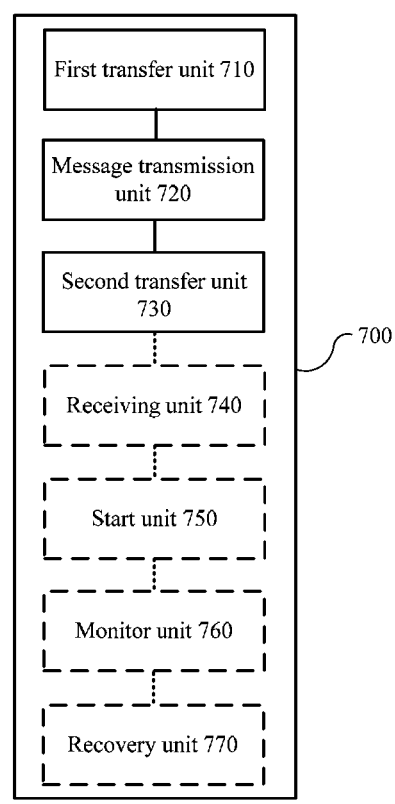
FIG. 7 is a block diagram of a device for transferring data according to an embodiment of the present invention.

FIG. 7 is a block diagram of a device for transferring data according to an embodiment of the present invention. An example of a device 700 as shown in FIG. 7 is a UE, e.g., may be the UE 120 of the communication system 100 as shown in FIG. 1. The device 700 includes a first transfer unit 710, a message transmission unit 720 and a second transfer unit 730.

The first transfer unit 710 transfers data with a base station via a first link, with a second link offloading for the first link. If an RLF occurs on the first link, the message transmission unit 720 transmits an RLF indication message to the base station, where the RLF indication message is used to notify the base station that the RLF occurs on the first link. The second transfer unit 730 transfers, over the second link, at least a portion of the data on the first link.

According to embodiments of the present invention, when a radio link failure occurs between the user equipment and the base station during a mobile data offloading process, data transfer is performed via the offloading link, thus a time delay can be reduced and the data transfer efficiency is improved.

For other functions and operations of the device 700, reference may be made to the process relating to the UE in the method embodiment as shown in FIG. 2 above, which will not be described in detail to avoid redundancy.

Alternatively, as an embodiment, in a case where the offloading by the second link for the first link is offloading not based on an RB, the RLF indication message transmitted by the message transmission unit 720 is also used to request the base station to offload onto the second link at least a portion of downlink data scheduled on the first link. The second transfer unit 730 can offload onto the second link at least a portion of uplink data scheduled on the first link.

Alternatively, as another embodiment, as shown in FIG. 7, the device 700 further includes a receiving unit 740. In a case where the offloading by the second link for the first link is the offloading based on an RB and a SRB is scheduled on the second link for transfer, the RLF indication message transmitted by the message transmission unit 720 is also used to request the base station to configure at least one RB on the first link, so that the at least one RB is offloaded onto the second link. The receiving unit 740 can receive via the SRB an offloading reconfiguration message transmitted by the base station according to the RLF indication message, where the offloading reconfiguration message is used to indicate information of at least one RB offloaded from the first link onto the second link. The second transfer unit 730 can transfer, over the second link, at least one RB on the first link according to the offloading reconfiguration message.

Alternatively, as another embodiment, as shown in FIG. 7, the device 700 further includes a start unit 750, a monitor unit 760, and a recovery unit 770. After an RLF occurs on the first link, the start unit 750 starts a first timer. The monitor unit 760 monitors, within a time length of the first timer, whether the first link is recovered, where the time length is notified by the base station or is pre-configured by itself. The recovery unit 770 initiates an RA in a case where the monitor unit 760 monitors that the first link is recovered, so as to transfer data with the base station via the recovered first link.

Alternatively, as another embodiment, the monitor unit 760 can monitor whether N in-sync indications are detected successively, where N is a positive integer and is notified by the base station or is pre-configured by itself.

Alternatively, as another embodiment, in a case where the first timer times out and the monitor unit 760 monitors that the first link is not recovered, the recovery unit 770 can also initiate an RRC connection reestablishment procedure and suspend all the RBs of the first link and all the RBs of the second link, so as to reestablish the first link.

Alternatively, as another embodiment, the RLF indication message transmitted by the message transmission unit 720 can be a newly-added information element in an RRC message, can also be a newly-added RRC message, and can still be an MAC CE.

Figure 8:
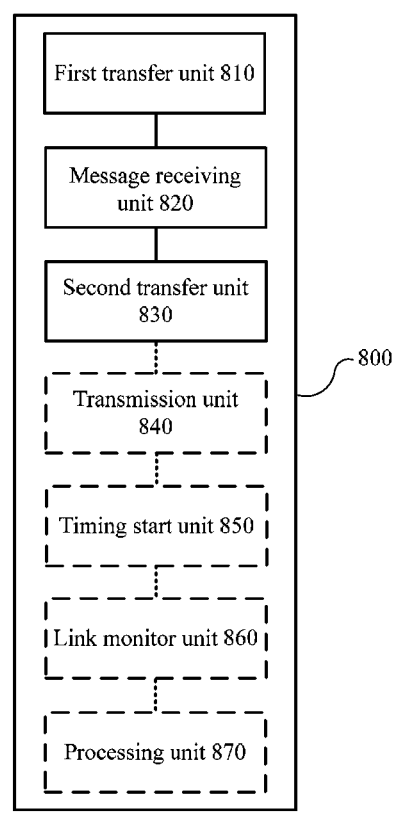
FIG. 8 is a block diagram of a device for transferring data according to another embodiment of the present invention.

FIG. 8 is a block diagram of a device for transferring data according to another embodiment of the present invention. An example of a device 800 as shown in FIG. 8 is a base station, e.g., may be the base station 110 of the communication system 100 as shown in FIG. 1. The device 800 includes a first transfer unit 810, a message receiving unit 820, and a second transfer unit 830.

The first transfer unit 810 transfers data with a UE via a first link, with a second link offloading for the first link. If an RLF occurs on the first link, the message receiving unit 820 receives an RLF indication message from the UE, where the RLF indication message is used to notify that the RLF occurs on the first link. The second transfer unit 830 transfers, over the second link, at least a portion of the data on the first link according to the RLF indication message.

According to embodiments of the present invention, when a radio link failure occurs between the user equipment and the base station during a mobile data offloading process, data transfer is performed via the offloading link, thus a time delay can be reduced and the data transfer efficiency is improved.

For other functions and operations of the device 800, reference may be made to the process relating to the base station in the method embodiment as shown in FIG. 3 above, which will not be described in detail to avoid redundancy.

Alternatively, as an embodiment, in a case where the offloading by the second link for the first link is offloading not based on an RB, the RLF indication message received by the message receiving unit 820 is also used to request to offload onto the second link at least a portion of downlink data scheduled on the first link.

Alternatively, as another embodiment, as shown in FIG. 8, the device 800 also includes a transmission unit 840. In a case where the offloading by the second link for the first link is offloading based on an RB and a SRB is scheduled on the second link for transfer, the RLF indication message received by the message receiving unit 820 is also used to request to configure at least one RB on the first link, so that the at least one RB is offloaded onto the second link. The transmission unit 840, according to the RLF indication message, transmits an offloading reconfiguration message to the UE via the SRB, where the offloading reconfiguration message is used to indicate information of at least one RB offloaded from the first link onto the second link.

Alternatively, as another embodiment, as shown in FIG. 8, the device 800 also includes a timing start unit 850, a link monitor unit 860, and a processing unit 870. The timing start unit 850 starts a second timer after the RLF occurs on the first link. Within a time length of the second timer, the link monitor unit 860 monitors whether the first link is recovered, where the time length is pre-configured by itself. In a case where the link monitor unit 860 monitors that the first link is recovered, the processing unit 870 triggers the UE to initiate an RA via a PDCCH command so as to transfer data with the UE via the recovered first link.

Alternatively, as another embodiment, the link monitor unit 860 can monitor whether N in-sync indications are detected successively, where the N is a natural number and is pre-configured or is a default configuration in a wireless protocol.

Alternatively, as another embodiment, the processing unit 870 can also initiate an RRC connection release procedure in a case where the second timer times out and the link monitor unit 860 monitors that the first link is not recovered, so as to release the first link.

Alternatively, as another embodiment, the RLF indication message received by the message receiving unit 820 can be a newly-added information element in an RRC message, can also be a newly-added RRC message, and can still be an MAC CE.

Figure 9:
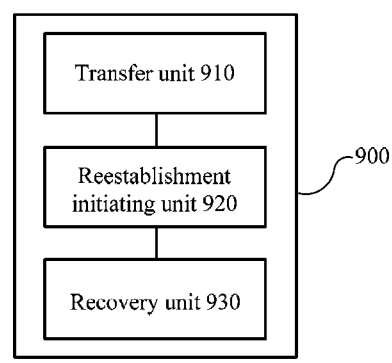
FIG. 9 is a block diagram of a device for transferring data according to another embodiment of the present invention.

FIG. 9 is a block diagram of a device for transferring data according to another embodiment of the present invention. An example of a device 900 as shown in FIG. 9 is a UE, e.g., may be the UE 120 of the communication system 100 as shown in FIG. 1. The device 900 includes a transfer unit 910, a reestablishment initiating unit 920, and a recovery unit 930.

The transfer unit 910 transfers data with a base station via a first link, with a second link offloading for the first link. If an RLF occurs on the first link, the reestablishment initiating unit 920 initiates an RRC connection reestablishment and suspends all the RBs of the first link and all the RBs of the second link. The recovery unit 930 recovers all the RBs of the first link and all the RBs of the second link, so as to recover the data transfer with the base station.

According to embodiments of the present invention, when a radio link failure occurs between the user equipment and the base station during a mobile data offloading process, transmission resources can be saved by stopping the data transfer process.

For other functions and operations of the device 900, reference may be made to the process relating to the UE in the method embodiment as shown in FIG. 4 above, which will not be described in detail to avoid redundancy.

Figure 10:
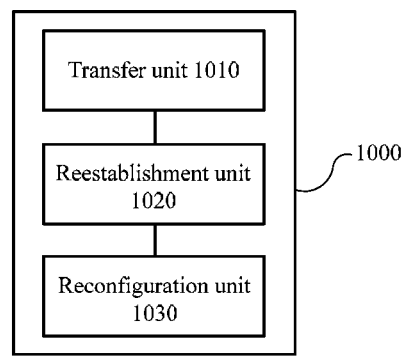
FIG. 10 is a block diagram of a device for transferring data according to another embodiment of the present invention.

FIG. 10 is a block diagram of a device for transferring data according to another embodiment of the present invention. An example of a device 1000 as shown in FIG. 10 is a base station, e.g., may be the base station 110 of the communication system 100 as shown in FIG. 1. The device 1000 includes a transfer unit 1010, a reestablishment unit 1020, and a reconfiguration unit 1030.

The transfer unit 1010 transfers data with a UE via a first link, a second link offloads for the first link. If an RLF occurs on the first link, the reestablishment unit 1020 and the UE perform an RRC connection reestablishment. The reconfiguration unit 1030 performs a reconfiguration to the UE so as to recover the data transfer with the UE.

According to embodiments of the present invention, when a radio link failure occurs between the user equipment and the base station during a mobile data offloading process, transmission resources can be saved by stopping the data transfer process.

For other functions and operations of the device 1000, reference may be made to the process relating to the base station in the method embodiment as shown in FIG. 5 above, which will not be described in detail to avoid redundancy.

Alternatively, as another embodiment, the reconfiguration unit 1030 may modify an RB of the second link, and information of the connection to the access point of the second link corresponding to the RB.

Ordinary persons skilled in the art may realize that, based on the embodiments disclosed in this text, the described units and algorithm procedures in each example can be achieved by an electronic hardware or a combination of computer software and an electronic hardware. Whether these functions should be performed in the way of hardware or software, it depends on specific applications of the technical solutions and designed restriction conditions. Persons skilled in the art may employ different methods for each specific application so as to realize the described functions, but such realization should not be considered as going beyond the scope of present invention.

Persons skilled in the art may clearly know that, for the convenience of a concise description, regarding specific working processes of the system, the device and units described above, reference may be made to the corresponding processes in the foregoing method embodiments in which. It is unnecessary to go into details herein.

It should be understood that the system, the device, and the method disclosed in several embodiments of the present application may be achieved by other means. For example, the device embodiments described above are illustrative merely; e.g., the division for the described units is merely a division by logical function, and there may be extra division methods when in actual implementations, e.g., a plurality of units or components may be combined or may be integrated into another system, or some features may be ignored or may not be performed. Another point to mention, displayed or discussed couplings between each other, or direct couplings, or communication links may be via some interfaces, the indirect couplings or communication links between devices or units may be electrical, mechanical or in other forms.

The units described as separating components may be or may not be physically separated, the components shown as units may be or may not be physical units, i.e. locating in one place or may also be distributed to a plurality of network units. Some of or all of the units may be selected according to actual demands so as to realize the purpose of the technical solutions in the embodiments of present of invention.

In addition, each functional unit in embodiments of the present invention may be integrated into one processing unit, or each unit may be in a separate physical presence, or two or more than two units may be integrated into one unit.

If the functions are realized in the form of a software functional unit and are sold and used as independent products, they can be stored in a computer readable storage medium. Based on this understanding, the technical solutions of the present invention in essence, or the parts with contribution to the prior art, or a part of the technical solutions, may be embodied in the form of a software product. The computer software product is stored in a storage medium which includes some instructions for enabling one computer device (may be a personal computer, a server, or a network device, etc.) to perform all or a part of the steps of methods as described in embodiments of the present invention. The foregoing storage medium includes: various media which can store program codes, such as a USB disk, a mobile hard disk, a read-only memory (ROM, Read-Only Memory), a random access memory (RAM, Random Access Memory), a diskette, a compact disk, etc.

The above descriptions are only specific implementation methods of the present invention. However, the protection scope of the present invention shall not be limited thereto. A modification or a replacement within the scope of techniques disclosed in the present invention may be easily thought of by any persons skilled in the art should be included in the protection scope of present invention. Therefore, the protection scope of the present invention shall be subject to the protection scope of the claims.

What is claimed is:

1. A method for transferring data, comprising:
   transferring data with a base station via a first link, wherein a second link is established for offloading for the first link;
   transmitting, if a radio link failure (RLF) occurs on the first link, an RLF indication message to the base station, wherein the RLF indication message is used to notify the base station that the RLF occurs on the first link; and
   transferring, over the second link, at least a portion of the data on the first link.

2. The method according to claim 1, wherein in a case where the offloading by the second link for the first link is offloading not based on a radio bearer (RB) offloading, the RLF indication message is also used to request the base station to offload onto the second link at least a portion of downlink data scheduled on the first link;
   the transferring, over the second link, at least a portion of the data on the first link comprises: offloading onto the second link at least a portion of uplink data scheduled on the first link.

3. The method according to claim 1, wherein, in a case where offloading by the second link for the first link is offloading based on a radio bearer (RB) and a signaling radio bearer (SRB) is scheduled on the second link for transfer, the RLF indication message is also used to request the base station to configure at least one RB on the first link, so that the at least one RB is offloaded onto the second link;
   the method further comprises:
   receiving, via the SRB, an offloading reconfiguration message transmitted by the base station according to the RLF indication message, wherein the offloading reconfiguration message is used to indicate information of at least one RB offloaded from the first link onto the second link;
   the transferring, over the second link, at least a portion of the data on the first link comprises:
   transferring, according to the offloading reconfiguration message and over the second link, the at least one RB on the first link.

4. The method according to claim 1, wherein the method further comprises:
   starting, when an RLF occurs on the first link, a first timer;
   monitoring, within a time length of the first timer, whether the first link is recovered, wherein the time length is notified by the base station or is pre-configured;

initiating, in a case where the first link being recovered is monitored, a random access so as to transfer the data with the base station via the recovered first link.

5. The method according to claim 4, wherein the monitoring whether the first link is recovered, comprises:
monitoring whether N in-sync indications are detected successively, wherein N is a positive integer and is notified by the base station or is pre-configured.

6. The method according to claim 4, wherein the method further comprises: in a case where the first timer times out and the first link being recovered is monitored, initiating a radio resource control (RRC) connection reestablishment procedure and suspending all radio bearers (RB) of the first link and all RBs of the second link, so as to reestablish the first link.

7. The method according to claim 1, wherein the RLF indication message is a newly-added information element in an RRC message, or is a newly-added RRC message, or is a medium access control (MAC) control element.

8. A device for transferring data, comprising:
a first transfer unit, configured to transfer the data with a base station via a first link, wherein a second link is established for offloading for the first link;
a message transmission unit, configured to transmit, if a radio link failure (RLF) occurs on the first link, an RLF indication message to the base station, wherein the RLF indication message is used to notify the base station that the RLF occurs on the first link; and
a second transfer unit, configured to transfer, over the second link, at least a portion of the data on the first link.

9. The device according to claim 8, wherein in a case where the offloading by the second link for the first link is offloading not based on a radio bearer (RB), the RLF indication message transmitted by the message transmission unit is also used to request the base station to offload onto the second link at least a portion of downlink data scheduled on the first link;
the second transfer unit is configured to offload onto the second link at least a portion of uplink data scheduled on the first link.

10. The device according to claim 8, wherein the device further comprises a receiving unit, in a case where the offloading by the second link for the first link is offloading based on an RB and a signaling radio bearer (SRB) is scheduled on the second link for transfer, the RLF indication message transmitted by the message transmission unit is also used to request the base station to configure at least one RB on the first link, so that the at least one RB is offloaded onto the second link;
the receiving unit is configured to receive, via the SRB, an offloading reconfiguration message transmitted by the base station according to the RLF indication message, wherein the offloading reconfiguration message is used to indicate information of the at least one RB offloaded from the first link onto the second link;
the second transfer unit is configured to transfer, according to the offloading reconfiguration message and over the second link, the at least one RB on the first link.

11. The device according to claim 8, wherein the device further comprises:
a start unit, configured to start a first timer when the RLF occurs on the first link;
a monitor unit, configured to monitor, within a time length of the first timer, whether the first link is recovered, wherein the time length is notified by the base station or is pre-configured;
a recovery unit, configured to initiate, in a case where the monitor unit monitors that the first link is recovered, a random access, so as to transfer the data with the base station via the recovered first link.

12. The device according to claim 11, wherein the monitor unit is configured to monitor whether N in-sync indications are detected successively, wherein N is a positive integer and is notified by the base station or is pre-configured.

13. The device according to claim 12, wherein the recovery unit is further configured to, in a case where the first timer times out and the monitor unit monitors that the first link is not recovered, initiate a radio resource control (RRC) connection reestablishment procedure and suspend all radio bearers (RB) of the first link and all RBs of the second link, so as to reestablish the first link.

14. The device according to claim 8, wherein the RLF indication message transmitted by the message transmission unit is a newly-added information element in an RRC message, or is a newly-added RRC message, or is a medium access control (MAC) control element.

15. A device for transferring data, comprising:
a first transfer unit, configured to transfer data with a user equipment (UE) via a first link, wherein a second link is established for offloading for the first link;
a message receiving unit, configured to receive, if a radio link failure (RLF) occurs on the first link, an RLF indication message from the UE, wherein the RLF indication message is used to notify that the RLF occurs on the first link;
a second transfer unit, configured to transfer, according to the RLF indication message and over the second link, at least a portion of the data on the first link.

16. The device according to claim 15, wherein in a case where the offloading by the second link for the first link is offloading not based on a radio bearer (RB), the RLF indication message received by the message receiving unit is also used to request to offload onto the second link at least a portion of downlink data scheduled on the first link.

17. The device according to claim 15, wherein the device further comprises a transmission unit,
in a case where the offloading by the second link for the first link is offloading based on an RB and a signaling radio bearer (SRB) is scheduled on the second link for transfer, the RLF indication message received by the message receiving unit is also used to request to configure at least one RB on the first link, so that the at least one RB is offloaded onto the second link;
the transmission unit is configured to transmit, according to the RLF indication message, an offloading reconfiguration message to the UE via the SRB, wherein the offloading reconfiguration message is configured to indicate information of the at least one RB offloaded from the first link onto the second link.

18. The device according to claim 15, wherein the device further comprises:
a timing start unit, configured to start a second timer when the first link experiences the RLF;
a link monitor unit, configured to monitor, within a time length of the second timer, whether the first link is recovered, wherein the time length is pre-configured;
a processing unit, configured to trigger, in a case where the link monitor unit monitors that the first link is recovered and via a physical downlink control channel command, the UE to initiate a random access, so as to transfer the data with the UE via the recovered first link.

19. The device according to claim 18, wherein, the link monitor unit is configured to monitor whether N in-sync indications are detected successively, wherein N is a positive integer and is preconfigured.

20. The device according to claim 18, wherein the processing unit is further configured to initiate, in a case where the second timer times out and the link monitor unit monitors that the first link is not recovered, a radio resource control (RRC) connection release procedure, so as to release the first link.

* * * * *